United States Patent
Luo et al.

(10) Patent No.: US 10,466,770 B2
(45) Date of Patent: Nov. 5, 2019

(54) OPERATING VOLTAGE REGULATORS IN AN INFORMATION HANDLING SYSTEM

(71) Applicant: DELL PRODUCTS, L.P., Round Rock, TX (US)

(72) Inventors: Shiguo Luo, Austin, TX (US); Ralph H. Johnson, Round Rock, TX (US); Kejiu Zhang, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 181 days.

(21) Appl. No.: 15/588,455

(22) Filed: May 5, 2017

(65) Prior Publication Data
US 2018/0321735 A1 Nov. 8, 2018

(51) Int. Cl.
*G06F 1/3296* (2019.01)
*G06F 1/20* (2006.01)

(52) U.S. Cl.
CPC ............ *G06F 1/3296* (2013.01); *G06F 1/206* (2013.01)

(58) Field of Classification Search
CPC ...................................................... G06F 1/3296
USPC .................. 713/320, 340, 310, 300; 700/300
See application file for complete search history.

(56) References Cited

U.S. PATENT DOCUMENTS

| | | | | |
|---|---|---|---|---|
| 2007/0250219 A1* | 10/2007 | Gaskins | ..................... | G06F 1/08 700/299 |
| 2011/0004774 A1* | 1/2011 | Hansquine | ............ | G06F 1/3203 713/310 |
| 2013/0246820 A1* | 9/2013 | Branover | .............. | G06F 1/3296 713/320 |
| 2013/0311801 A1* | 11/2013 | Kong | ........................ | G06F 1/26 713/320 |
| 2013/0339777 A1* | 12/2013 | Varma | ....................... | G06F 1/26 713/340 |
| 2014/0229750 A1* | 8/2014 | Bhandaru | ............. | G06F 9/5094 713/320 |
| 2015/0326216 A1* | 11/2015 | Machnicki | ............. | H03K 17/14 307/117 |
| 2015/0331433 A1* | 11/2015 | Naffziger | ............... | G05B 15/02 700/300 |
| 2015/0346798 A1* | 12/2015 | Dongara | ............... | G06F 1/3206 713/320 |
| 2016/0094122 A1 | 3/2016 | Luo et al. | | |
| 2016/0190792 A1 | 6/2016 | Kellogg | | |
| 2016/0266629 A1* | 9/2016 | Merrikh | ..................... | G06F 1/28 |
| 2016/0285434 A1* | 9/2016 | Menon | .................... | H01L 23/58 |
| 2017/0060213 A1 | 3/2017 | Wu et al. | | |
| 2017/0063239 A1* | 3/2017 | Wu | .......................... | G06F 1/26 |
| 2017/0322575 A1* | 11/2017 | Du | .......................... | G05F 1/575 |

* cited by examiner

*Primary Examiner* — Aurel Prifti
(74) *Attorney, Agent, or Firm* — Isidore PLLC

(57) ABSTRACT

A method, a power control system, and an information handling system (IHS) for operating voltage regulators (VRs) in an IHS. The method includes detecting, via a VR controller, a real time current level of a processor and receiving a first temperature value from a temperature sensor. The VR controller calculates a modified current level based on the real time current level, the first temperature value and a pre-defined temperature value and applies the modified current level to the processor.

20 Claims, 7 Drawing Sheets

OPERATING VOLTAGE REGULATORS IN AN INFORMATION HANDLING SYSTEM

BACKGROUND

1. Technical Field

The present disclosure generally relates to information handling systems and in particular to operating voltage regulators in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a number of switching voltage regulators to provide low voltage power to processors, memory, input/output adapters, hard drives, and other devices. Numerous voltage regulators are provided on a motherboard and are connected to a common power plane with a common voltage. Typically, each processor or central processing unit (CPU) has a dedicated voltage regulator to provide power. Because of the mechanical design layout, cooling can be non-uniform within the information handling system, resulting in some voltage regulators and processors operating at different temperatures. Processors and voltage regulators that are in hot areas may be limited in their capacity to operate at their thermal limit. At the same time, processors and voltage regulators that are in cooler areas may not be allowed to operate at their maximum capacity.

BRIEF SUMMARY

Disclosed are a method, a power control system, and an information handling system (IHS) for operating voltage regulators (VRs) in an IHS to achieve maximum processor performance within the thermal capacity of the IHS in a given environment.

According to one embodiment, the method comprises detecting, via a VR controller, a real time load current level of a processor and receiving a first temperature value from a temperature sensor. The VR controller calculates a modified current level based on the real time load current level, the first temperature value, and a pre-defined temperature value, and the VR controller reports the modified current level to the processor.

According to another embodiment, a power control system comprises a power subsystem configured to be coupled to and supply power to functional components of an information handling system (IHS), the functional components including a processor. The power subsystem includes a voltage regulator (VR). The VR further includes a VR controller having firmware executing thereon that configures the VR controller to detect a real time load current level of a processor and to receive a first temperature value from a temperature sensor. The VR controller calculates a modified current level based on the real time load current level, the first temperature value, and a pre-defined temperature value, and the VR controller reports the modified current level to the processor.

Also disclosed is an IHS that comprises a processor and a power subsystem that is communicatively coupled to the processor and to functional components of the IHS. The power subsystem includes a voltage regulator (VR). The VR further includes a VR controller having firmware executing thereon that configures the VR controller to detect a real time load current level of a processor and to receive a first temperature value from a temperature sensor. The VR controller calculates a modified current level based on the real time load current level, the first temperature value and a pre-defined temperature value. The VR controller reports the modified current level to the processor.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
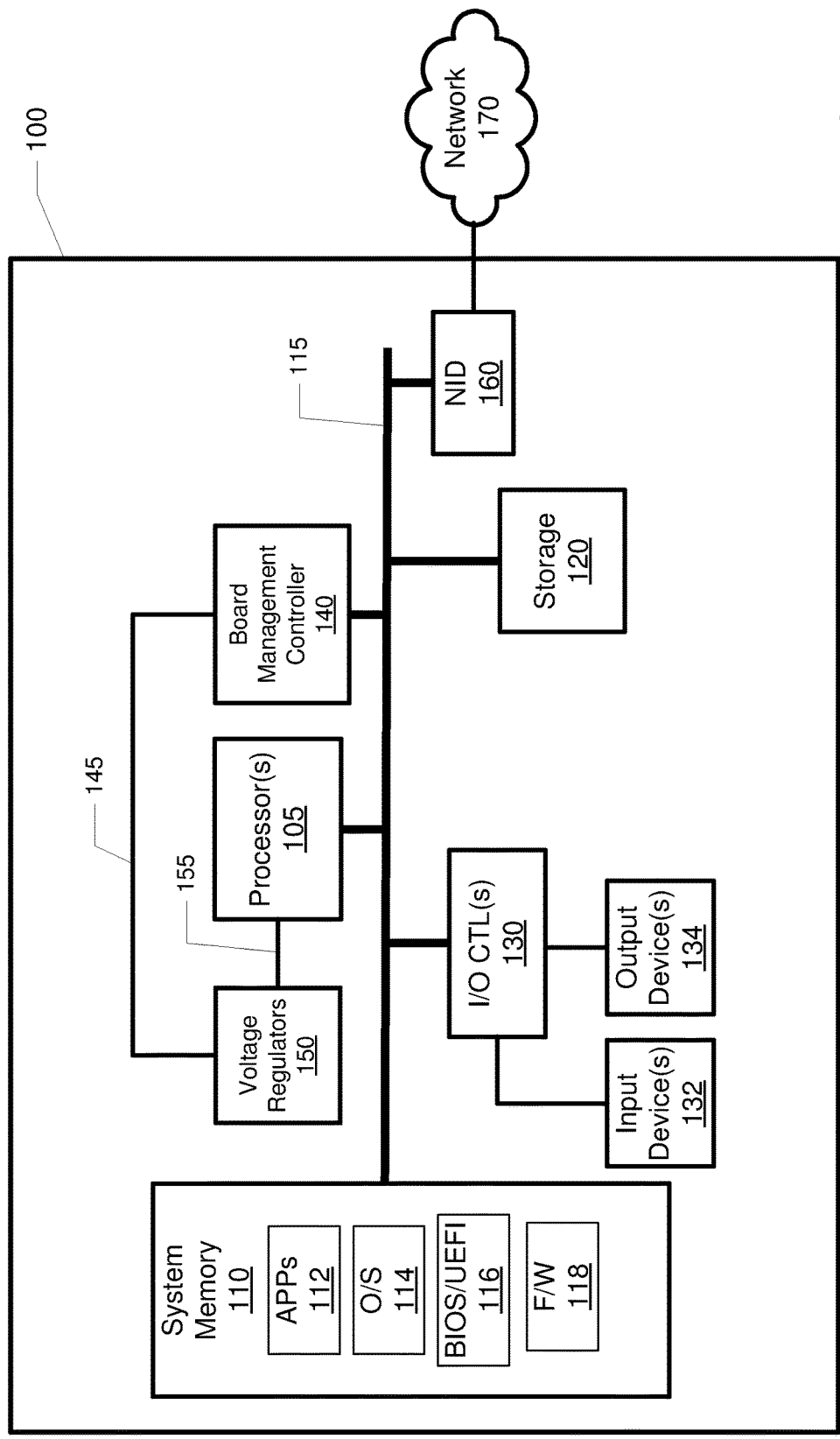
FIG. 1 illustrates an example information handling system within which various aspects of the disclosure can be implemented, according to one or more embodiments.

The illustrative embodiments provide a method, a power control system, and an information handling system (IHS) for operating voltage regulators (VRs) in an IHS. The method includes detecting, via a VR controller, a real time load current level of a processor and receiving a first temperature value from a temperature sensor. The VR controller calculates a modified current level based on the real time current level, the first temperature value, and a predefined temperature level and the VR controller reports the modified current level to the processor.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input/output system (BIOS) 116 and firmware (F/W) 118.

In one or more embodiments, BIOS 116 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s) or light emitting diodes (LEDs).

Additionally, in one or more embodiments, IHS 100 includes a board management controller (BMC) 140 that is coupled to system interconnect 115. BMC 140 contains components that at least partially enable an input power load to be determined for processor(s) 105. IHS 100 further includes several voltage regulators, collectively referred to as voltage regulators 150, which supply one or more voltage and current levels to processor(s) 105. Voltage regulators 150 are communicatively coupled to BMC 140 via a digital communication connection 145 such as an I2C bus or a power management (PM) bus. Voltage regulators 150 are connected to processor(s) 105 via data and power connection 155. Voltage regulators 150 also contain components that at least partially enable an input current level to be modified for processor(s) 105. In one embodiment, each processor can have an associated dedicated VR that supplies power to that processor.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
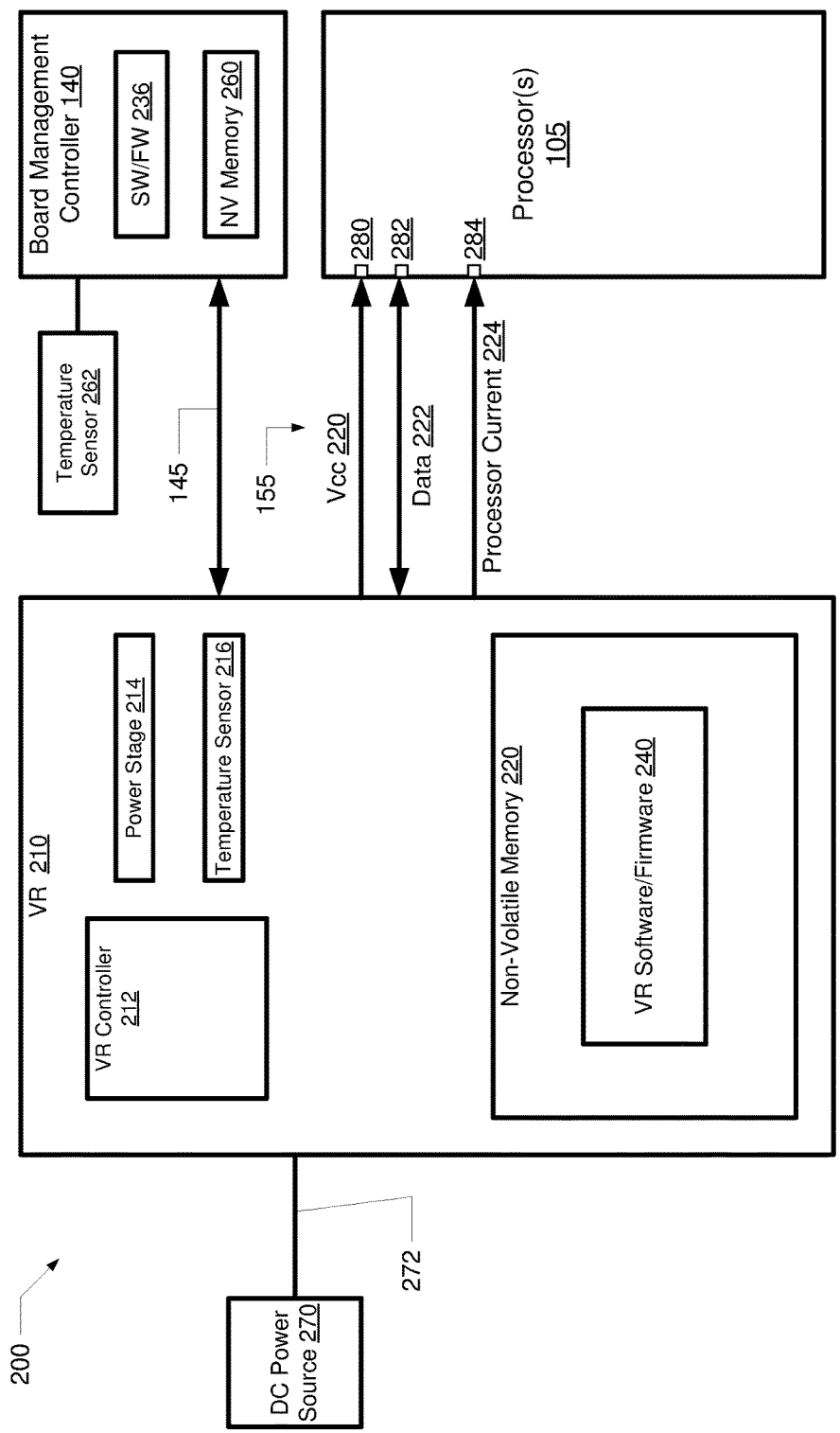
FIG. 2 illustrates a component level view of a power subsystem including a voltage regulator, a board management controller, and other functional components that supply power to a processor, in accordance with one embodiment.

With reference now to FIG. 2, there is shown an exemplary power subsystem 200 that implements a method of operating a VR. In the discussion of FIG. 2 and the following figures, the description of each figure can include general reference to the specific components illustrated within the preceding figures. Power subsystem 200 comprises BMC 140, VR 210, and direct current (DC) power source 270. BMC 140 is coupled to VR 210 via a digital communication connection 145 such as an I2C bus or a PMbus. BMC 140 can transmit and receive data from VR 210 via digital communication connection 145.

VR 210 can provide power to IHS 100 at several different voltages, currents, and power levels. In one embodiment, VR 210 can provide the main input voltage to processor(s) 105. DC power source 270 is connected to VR 210 via a power bus 272. DC power source 270 supplies input power to VR 210. VR 210 provides the main processor input voltage Vcc or main voltage rail to processor 105 via input power line Vcc 220, which is connected to processor input power terminal 280. VR 210 can communicate with processor 105 via data communication line 222, which is connected to processor data terminal 282. VR 210 can provide a processor load current input level or VR output current level signal via current line 224, which is connected to a current sense terminal 284 or digitally over data communication line 222. The VR output current level signal is an analog output signal from VR 210 to the current sense terminal 284 whose voltage level is proportional to the VR's total output load current. Alternatively the VR output current signal is digitized and reported to the processor via the data communication line 222. BMC 140 includes non-volatile (NV) memory 260 and BMC software/firmware 236, which can control functions of BMC 140. BMC 140 is in communication with a temperature sensor 262 that measures the ambient air temperature of IHS 100.

As one exemplary embodiment, VR 210 can include VR controller 212, power stage 214, temperature sensor 216, and NV memory 220 (which can be part of the VR controller or a separate entity). VR controller 212 can control one or more functions of VR 210. VR controller 212 can control the output of power stage 214 and determine the VR output current level signal. Power stage 214 contains circuitry that provides regulated power to processor 105. Temperature sensor 216 can provide an electrical signal that corresponds to the temperature of VR 210. In one embodiment, NV memory 220 contains VR software/firmware 240 that configures VR 210 to modify the output current level signal or the digital value of the output current level provided to the processor such that the processor can operate at a higher clock rate.

Figure 3B:
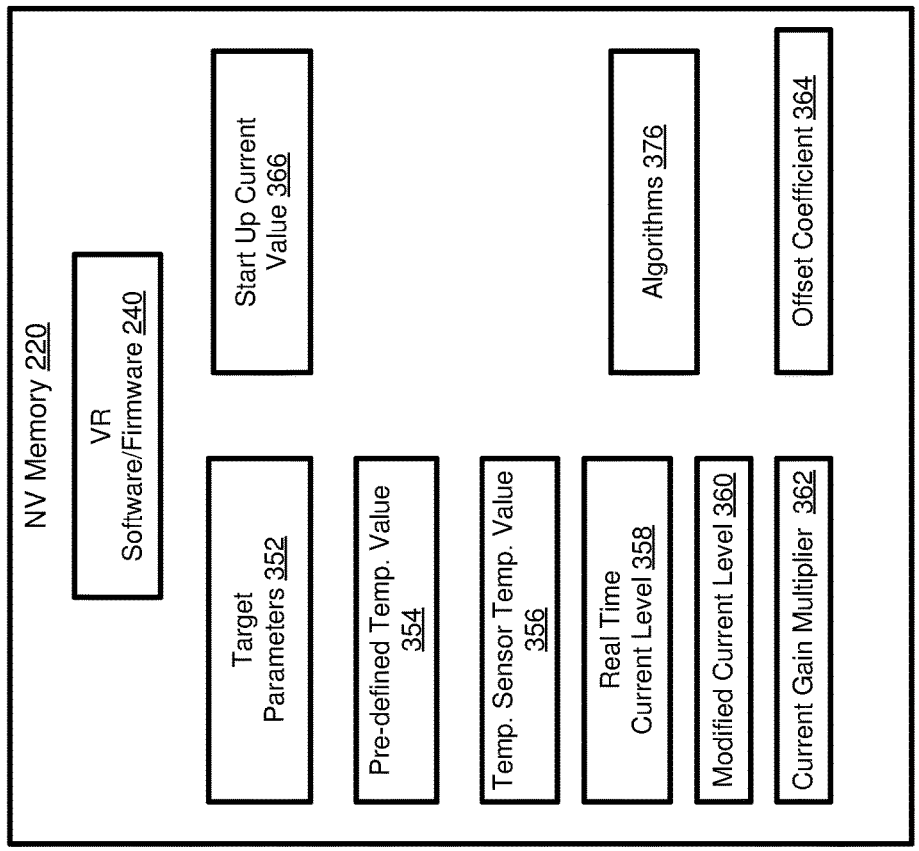
FIG. 3B illustrates example contents a voltage regulator memory, according to one or more embodiments.
Figure 3A:
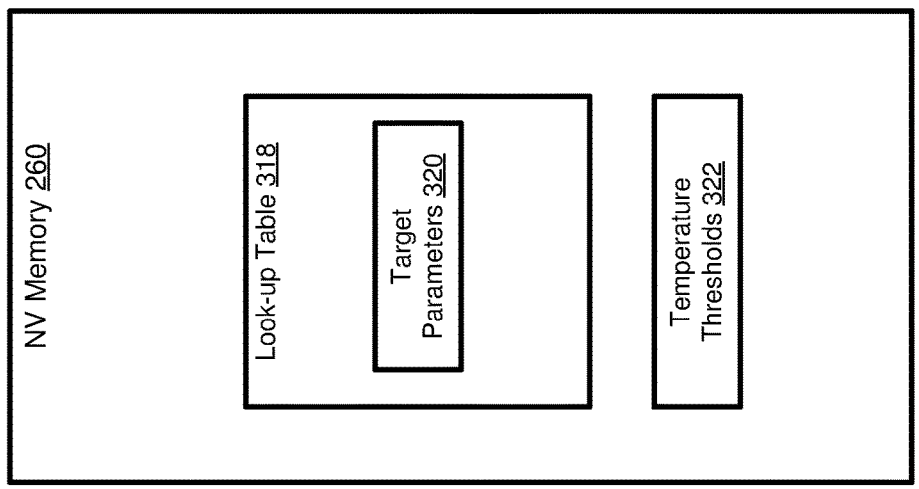
FIG. 3A illustrates example contents a board management controller memory, according to one or more embodiments.

Turning to FIG. 3A, there is shown one embodiment of example contents of NV memory 260. NV memory 260 includes a look-up table 318 that contains target parameters 320 that are used by VR controller 212 during the start-up and operation of VR 210. Target parameters 320 can include data and information on the processor model number and capabilities, the VR model number and capabilities, and the VR phase count. In one embodiment, initial target parameters 320 can include an initial real time current level, an initial temperature sensor temperature value, and a pre-defined temperature value. NV memory 260 further includes temperature thresholds 322 that provide a maximum value for an ambient air temperature within IHS 100 and a maximum value for a processor temperature.

Referring to FIG. 3B, there is shown one embodiment of example contents of NV memory 220. NV memory 220 includes VR software/firmware 240, which configures VR controller 212 to modify the output current level signal provided to the processor such that the processor can operate at a higher clock rate. NV memory 220 further includes target parameters 352, start up current value 366, pre-defined temperature value 354, temperature sensor temperature value 356, real time current level 358, and modified current level 360. Target parameters 352 are the parameters used during start-up to calculate the start up current value 366 for processor 105. Target parameters 352 are also used during the operation of VR 210. Target parameters 352 are received from BMC 140.

Pre-defined temperature value 354 is a threshold temperature value that VR 210 uses to determine when to start decreasing the magnitude of the amount of load current underreporting to result in processor 105 reducing its load demand on the VR. Pre-defined temperature value 354 is a specific operating temperature that is determined by a manufacturer based on testing. Temperature sensor temperature value 356 is the real time temperature received from temperature sensor 216. Real time current level 358 ($I_{real-time}$) is the present current value provided on processor current line 224 to processor 105 by VR 210. Modified current level 360 ($I_{modified}$) is the new current value calculated by VR controller 212 that will be provided to processor 105. The modified current level 360 is based on a function of the real time current level 358, the pre-defined temperature value 354, and the temperature sensor temperature value 356. The modified current level 360 can have a higher, a lower, or an equal value than the real time current level 358, depending upon the result of the calculation. In one embodiment, where the modified current level 360 is lower than the real time current level 358, the modified current level 360 allows processor 105 to operate at a higher clock rate while still operating within thermal limits of the VR as reported by the Temperature Sensor 216 or the processor 105.

NV memory 220 also includes current gain multiplier 362, offset coefficient 364 and algorithms 376. Current gain multiplier 362 ($I_{gain}$) and offset coefficient 364 ($I_{offset}$) are calculated values that are each based on functions of temperature sensor temperature value 356 and pre-defined temperature value 354. Algorithms 376 contain formulas and functions used to compute modified current level 360 and other values.

In an embodiment, algorithms 376 can contain the following formulas to calculate modified current level 360:

$$I_{modified} = I_{real\ time}(I_{gain}) + I_{offset} \quad (1)$$

$$I_{gain} = f(T_{sense} - T_{pre\text{-}defined}) \quad (2)$$

$$I_{offset} = f(T_{sense} - T_{pre\text{-}defined}) \quad (3)$$

In the above equations, the modified current level 360 ($I_{modified}$) is equal to the real time current level 358 ($I_{real\ time}$) multiplied by the current gain multiplier 362 ($I_{gain}$) and added to the offset coefficient 364 ($I_{offset}$). The current gain multiplier 362 ($I_{gain}$) is a function of the difference between the temperature sensor temperature value 356 ($T_{sense}$) and the pre-defined temperature value 354 ($T_{pre\text{-}defined}$). Further details and bounds of $I_{gain}$ are given in equation (4).

$$I_{gain} = I_{gain\ normnal} + \alpha(T_{sense} - T_{pre\text{-}defined})$$

$$\text{where: } T_{range1} < (T_{sense} - T_{pre\text{-}defined}) < T_{range2}$$

$$I_{gain\ minimum\ is}(T_{sense} - T_{pre\text{-}defined}) < T_{range1}$$

$$I_{gain\ maximum\ is}(T_{sense} - T_{pre\text{-}defined}) > T_{range2} \quad (4)$$

The offset coefficient 364 ($I_{offset}$) is also a function of the difference between the temperature sensor temperature value 356 ($T_{sense}$) and the pre-defined temperature value 354 ($T_{pre\text{-}defined}$). Further details and bounds of $I_{offset}$ are given in equation (5).

$$I_{offset} = I_{offset\ nominal} + \beta(T_{sense} - T_{pre\text{-}defined})$$

$$\text{where: } T_{range1} < (T_{sense} - T_{pre\text{-}defined}) < T_{range2}$$

$$I_{offset\ minimum\ is}(T_{sense} - T_{pre\text{-}defined}) < T_{range1}$$

$$I_{offset\ maximum\ is}(T_{sense} - T_{pre\text{-}defined}) > T_{range2} \quad (5)$$

The $I_{gain}$ and $I_{offset}$ functions can be realized by using either a look-up table such as look-up table 318 or the above linear equations. α, β are the constant for the linear equations. Igain_MAX and Igain_MIN are the absolute max and min values for the gain that can be set. Ioffset_MAX and Ioffset_MIN are the absolute max and min values for the offset that can be set. Tsense is the real-time reported temperature value from temperature sensor 216 for the VR. Tpre-defined is the dynamic thermal target adjusted by the BMC that the VR can be operated within. Trange1 is the dynamic range of Tsense from the VR that can be deviated from the Tpre-defined for underreporting. Trange2 is the dynamic range of Tsense from the VR that can be deviated from the Tpre-defined for overreporting current level. Trange2 can be zero if no overreporting is allowed.

In one embodiment, VR controller 212, executing VR software/firmware 240 can detect the real time current level 358 of processor 105 and receive a temperature value 356 from temperature sensor 216. VR controller 212 calculates modified current level 360 based on the real time current level 358, temperature value 356, and pre-defined temperature value 354, and VR controller applies the modified current level 360 to processor 105. The modified current level 360 can be greater than, less than, or equal to the real time current level 358, depending on the calculation result.

FIGS. 4A, 4B, 5 and 6 illustrate flowcharts of exemplary methods by which power subsystem 200 within the preceding figures performs different aspects of the processes that enable the one or more embodiments of the disclosure.

Generally, method 400 represents a method by which BMC 140 determines initial target parameters. Method 450 represents a method by which VR controller 212 determines an initial or startup current level for processor 105. Method 500 represents a method by which VR controller 212 modifies the current level for processor 105 to allow processor 105 to operate at a higher clock rate, if VR 210 and processor 105 are operating within certain thermal limits. Method 600 represents a method by which BMC 140 determines new target parameters.

The description of each method is provided with general reference to the specific components illustrated within the preceding FIGS. 1-3B. Generally, methods 400 and 600 are described as being implemented via the execution of code provided by software/firmware 236 acting within BMC140. Methods 450 and 500 are described as being implemented via the execution of code provided by VR software/firmware 240 acting within VR controller 212. It is however appreciated that certain aspects of the described methods may be implemented via other processing devices and/or execution of other code.

Figure 4A:
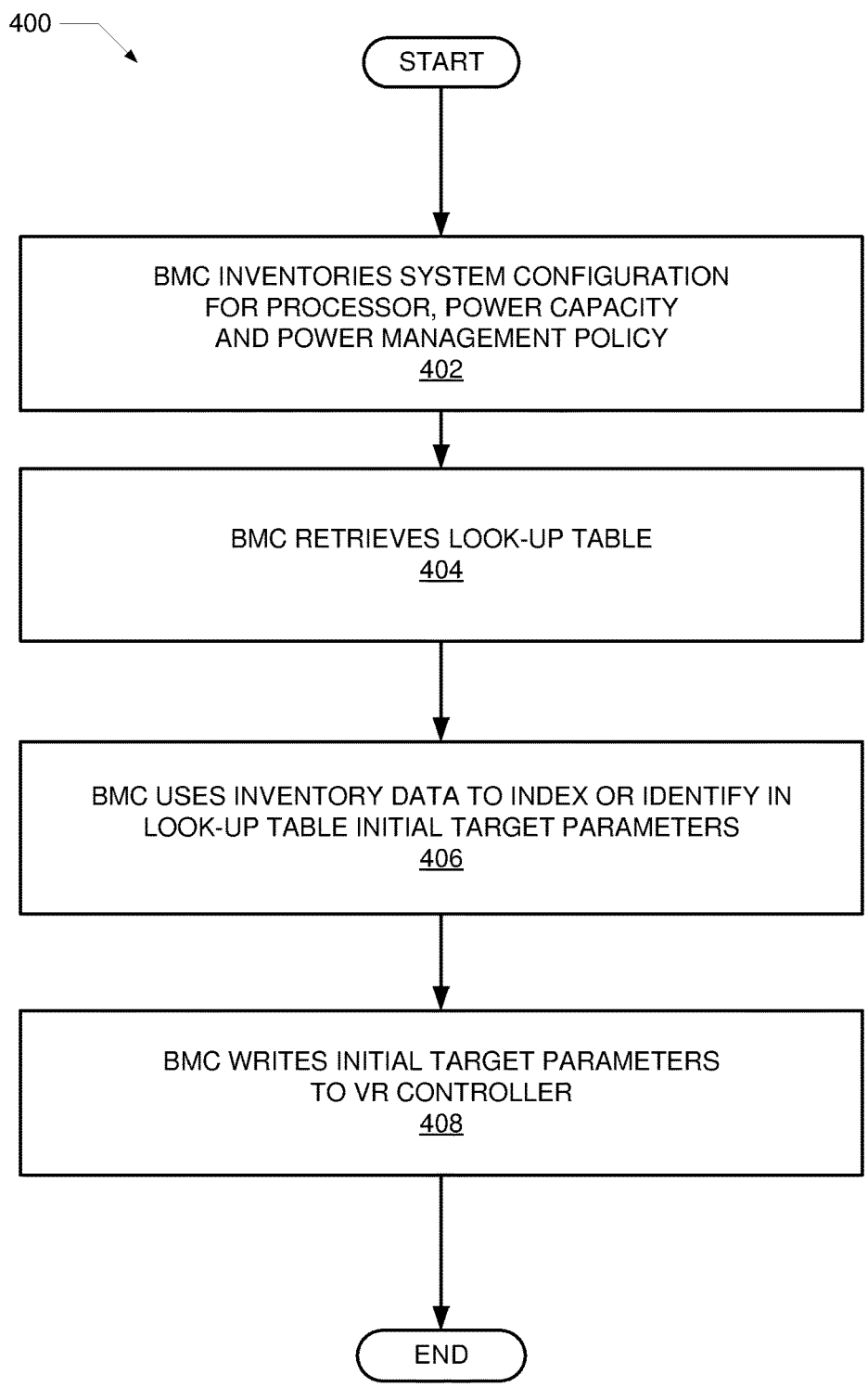
FIG. 4A is a flow chart illustrating an example of a method by which a board management controller determines initial target parameters, according to one or more embodiments.

With specific reference to FIG. 4A, method 400 begins at the start block and proceeds to block 402 where BMC 140 inventories or queries components of IHS 100 for processor, power capacity and power management policies. BMC 140 retrieves look-up table 318 from NV memory 260 (block 404). BMC 140 uses the results of the query or inventory data to index or identify in look-up table 318 an initial set of target parameters 320 (block 406). The initial target parameters 320 can include an initial real time current level, an initial temperature sensor temperature value, and a pre-defined temperature value. BMC 140 transmits or writes the initial target parameters 320 to VR controller 212 (block 408). Method 400 then ends.

Figure 4B:
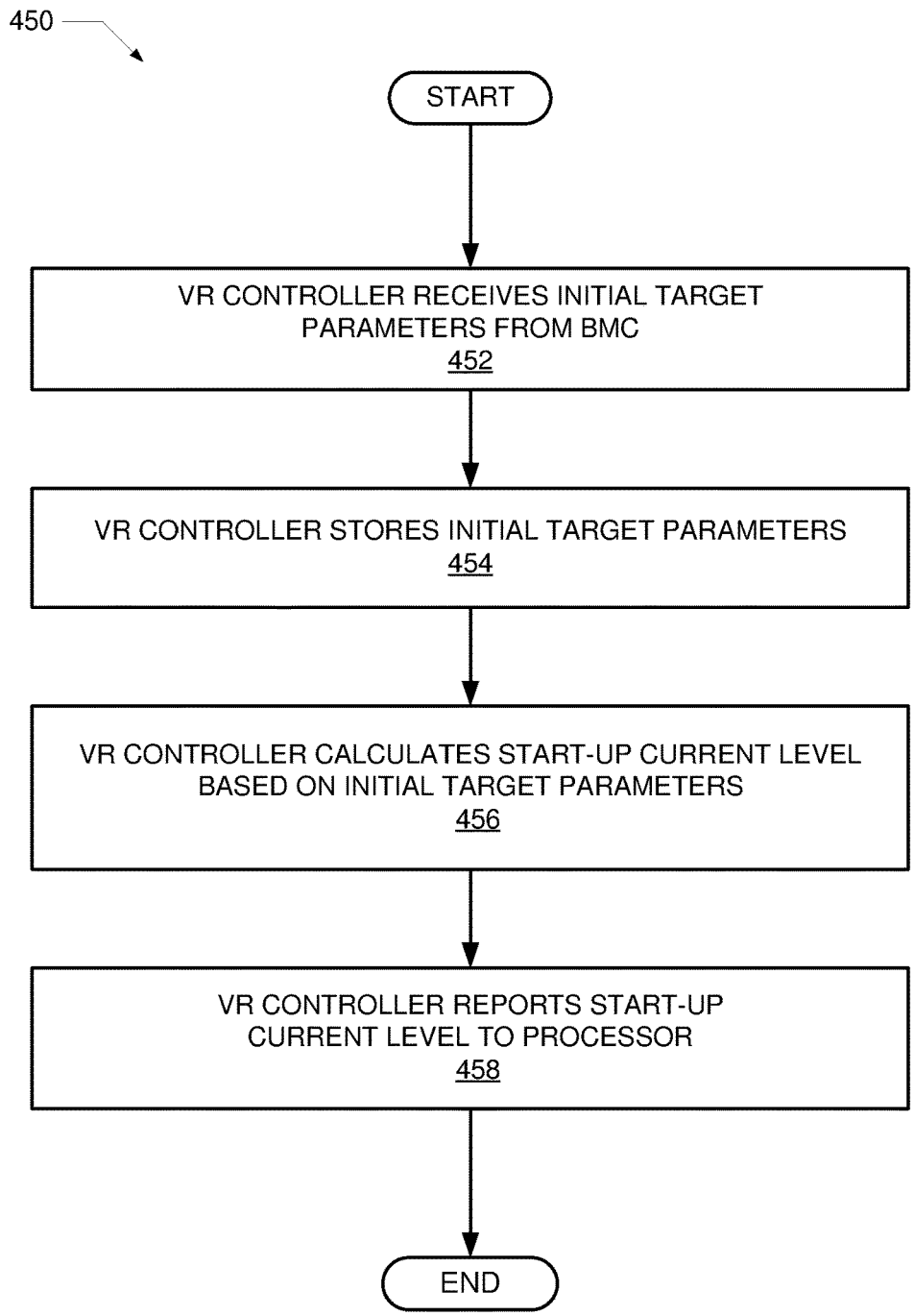
FIG. 4B is a flow chart illustrating an example of a method by which a voltage regulator controller enables a startup current level for a processor to be determined, according to one or more embodiments.

Turning to FIG. 4B, method 450 begins at the start block and proceeds to block 452 where VR controller 212 receives the initial target parameters 320 from BMC 140. The initial target parameters 320 can include an initial real time current level, an initial temperature sensor temperature value, and a pre-defined temperature value. VR controller 212 stores the received initial target parameters to NV memory 220 as target parameters 352 (block 454). VR controller 212 calculates a start-up current level 366 based on the initial target parameters 352 (block 456). VR controller 212 reports the start-up current level 366 to processor 105 via processor current line 224 (block 458) or digital communication bus 222. Method 450 then ends.

Figure 5:
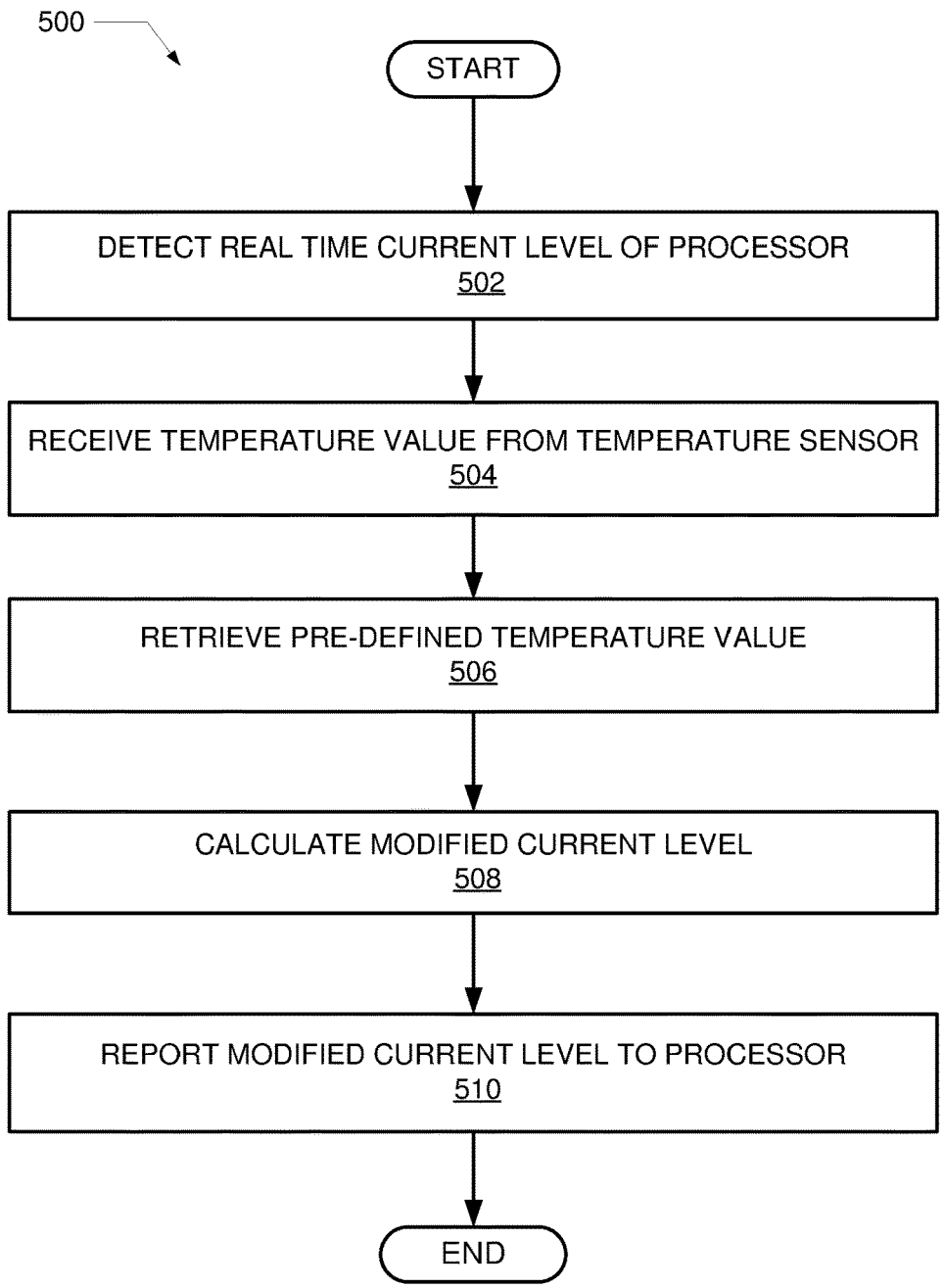
FIG. 5 is a flow chart illustrating an example of a method by which a voltage regulator controller enables the reported load current level to a processor to be modified, according to one or more embodiments.

FIG. 5 illustrates details of method 500 by which VR controller 212 modifies the processor current input level, via current line 224 or digitally via the data bus 222, to allow processor 105 to operate at a higher clock rate. Method 500 begins at the start block and proceeds to block 502 where VR controller 212 detects the real-time current level 358 of processor 105. VR controller 212 receives the temperature sensor temperature value 356 from temperature sensor 216 (block 504). VR controller 212 retrieves the pre-defined temperature value 354 from NV memory 220 (block 506). VR controller 212 calculates the modified current level 360 ($I_{modified}$) using formulas (1), (2) and (3) based on the real time current level 358, the temperature sensor temperature value 356 and the pre-defined temperature value 354 (block 508). The modified current level 360 can be greater than, less than, or equal to the real time current level 358, depending on the calculation result. VR controller reports the modified current level 360 to processor 105 via processor current line 224 (block 510) or digitally via data bus 222. Method 500 then terminates. In one embodiment, if modified current level 360 is less than the real time current level 358, processor 105 can operate at a higher clock rate. For example, a decreased reported current level from actual could allow processor 105 to increase its clock rate from 2.6 giga-hertz to 3.0 giga-hertz.

Figure 6:
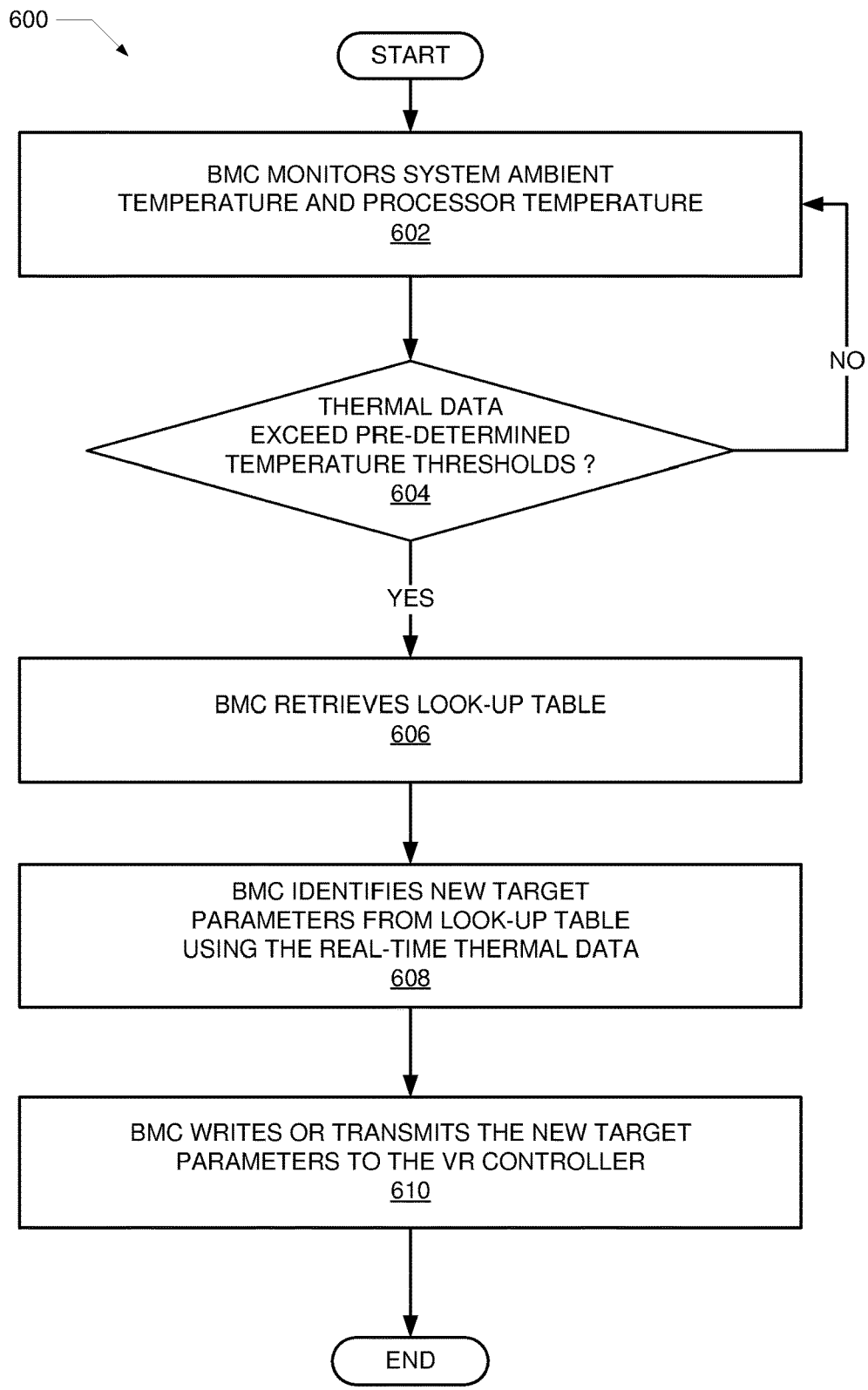
FIG. 6 is a flow chart illustrating an example of a method by which a board management controller determines new target parameters, according to one or more embodiments.

FIG. 6 illustrates details of method 600 by which BMC 140 determines new target parameters 352. Method 600 begins at the start block and proceeds to block 602 where BMC 140 monitors an ambient air temperature of IHS 100 and the temperature of processor 105. BMC 140 can receive the ambient air temperature via temperature sensor 262. Processor 105 includes internal circuitry that can monitor the temperature of the processor. BMC 140 determines if either of the temperature values received from temperature sensor 262 and/or processor 105 are greater than corresponding pre-determined temperature thresholds 322 (decision block 604). In response to determining that either of the temperature values received from temperature sensor 262 and/or processor 105 are not greater than the corresponding pre-determined temperature thresholds 322, BMC 140 continues to monitor the ambient air temperature of IHS 100 and the temperature of processor 105 at block 602.

In response to determining that the temperature values received from temperature sensor 262 and processor 105 are greater than the corresponding pre-determined temperature thresholds 322, BMC 140 retrieves look-up table 318 (block 606) and identifiers new target parameters 320 based on the thermal data of ambient air temperature and processor temperature (block 608). BMC 140 transmits or writes the new target parameters 320 to VR controller 212 (block 610). Method 600 then terminates.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for operating a voltage regulator (VR) in an information handling system (IHS), the method comprising:
    detecting, via a VR controller, a real time load current level of an associated processor, the VR communicatively coupled to a board management controller (BMC) via a digital communication connection;
    receiving a first temperature value from a temperature sensor;
    calculating a modified current level based on the real time current level, the first temperature value, and a pre-defined temperature value; and
    applying the modified current level to the processor, wherein in response to the modified current level being lower than the real time load current level, the modified current level allows the associated processor to operate at a higher clock rate while still operating within thermal limits of the VR.

2. The method of claim 1, wherein calculating the modified current level further comprises calculating a current gain multiplier and an offset coefficient, wherein the current gain multiplier and the offset coefficient are determined based on a first difference between the first temperature value and the pre-defined temperature value, the pre-defined temperature value being a dynamic thermal target adjusted by the BMC that the VR can be operated within.

3. The method of claim 1, wherein in response to the modified current level being greater than the real time current level, the method comprises applying the modified current level to enable the processor to operate at a greater clock rate than a clock rate enabled by the real time current level.

4. The method of claim 1, further comprising:
    receiving, from the BMC, a plurality of initial target parameters, the initial target parameters comprising an initial real time current level, an initial temperature sensor temperature value, and the pre-defined temperature value;
    storing the initial target parameters to a VR controller memory; and
    calculating a start-up current level based on the initial target parameters.

5. The method of claim 1, further comprising:
    monitoring, via the BMC, an ambient air temperature and a processor temperature;
    determining if the ambient temperature or the processor temperature are greater than a pre-determined threshold temperature; and
    in response to determining that the ambient temperature or the processor temperature are greater than the pre-determined threshold temperature; retrieving a look-up table; identifying new target parameters from the look-up table; and transmitting the new target parameters from the BMC to the VR, wherein identifying the new target parameters from the look-up table are based on the ambient air temperature and the processor temperature.

6. The method of claim 1, wherein the pre-defined temperature value is a threshold temperature value that the VR uses to determine when to start decreasing a magnitude of an amount of load current underreporting, the decreasing of the magnitude of the amount of load current underreporting resulting in the associated processor reducing its load demand on the VR.

7. The method of claim 1, wherein the VR is communicatively connect to the associated processor via a data and power connection which includes a data communication line, and the VR provides a processor load current input level and a VR output current level signal digitally over a data communication line, wherein the VR digitizes the VR output current signal and reports the VR output current signal to the processor via the data communication line.

8. A power control system comprising:
    a power subsystem configured to be coupled to and supply power to functional components of an information handling system (IHS) including a processor, the power subsystem including a voltage regulator (VR), the VR further including a VR controller, the VR controller having firmware executing thereon that configures the VR controller to:
    detect a real time load current level of an associated processor;
    receive a first temperature value from a temperature sensor;
    calculate a modified current level based on the real time current level, the first temperature value and a pre-defined temperature value; and
    apply the modified current level to the processor, wherein in response to the modified current level being lower than the real time load current level, the modified current level allows the associated processor to operate at a higher clock rate while still operating within thermal limits of the VR.

9. The power control system of claim 8, wherein calculating the modified current level further comprises calculating a current gain multiplier and an offset coefficient, wherein the current gain multiplier and the offset coefficient are determined based on a first difference between the first temperature level and the pre-defined temperature value, the pre-defined temperature value being a dynamic thermal target adjusted by the BMC that the VR can be operated within.

10. The power control system of claim 8, wherein in response to the modified current level being greater than the real time current level, applying the modified current level to the processor to enable the processor to operate at a greater clock rate than a clock rate enabled by the real time current level.

11. The power control system of claim 8, wherein the firmware further configures the VR controller to:
receive, from a board management controller (BMC), a plurality of initial target parameters, the initial target parameters comprising an initial real time current level, an initial temperature sensor temperature value, and the pre-defined temperature value;
store the initial target parameters to a VR controller memory; and
calculate a start-up current level based on the initial target parameters.

12. The power control system of claim 8, further comprising:
a board management controller (BMC) communicatively coupled to the processor and the power subsystem, the BMC having firmware executing thereon that configures the BMC to:
monitor an ambient temperature and a processor temperature;
determine if the ambient temperature or the processor temperature are greater than a pre-determined threshold temperature; and
in response to determining that the ambient temperature or the processor temperature are greater than the pre-determined threshold temperature; retrieve a look-up table; identify new target parameters from the look-up table; and transmit the new target parameters from the BMC to the VR, wherein the new target parameters are identified from the look-up table based on the ambient air temperature and the processor temperature.

13. The power control system of claim 8, wherein the pre-defined temperature value is a threshold temperature value that the VR uses to determine when to start decreasing a magnitude of an amount of load current underreporting, the decreasing of the magnitude of the amount of load current underreporting resulting in the associated processor reducing its load demand on the VR.

14. The power control system of claim 8, wherein the VR is communicatively connect to the associated processor via a data and power connection which includes a data communication line, and the VR provides a processor load current input level and a VR output current level signal digitally over a data communication line, wherein the VR digitizes the VR output current signal and reports the VR output current signal to the processor via the data communication line.

15. An information handling system (IHS) comprising:
at least one processor;
a board management controller (BMC); and
a power subsystem communicatively coupled to the at least one processor and to functional components of the IHS, the power subsystem including at least one voltage regulator (VR) assigned to each of the at least one processor, each of the at least one VR communicatively coupled to the board management controller (BMC) via a digital communication connection, the at least one VR further including a VR controller, a power state, a temperature sensor, and a non-volatile (NV) memory, the VR controller having firmware executing thereon that configures the VR controller to:
detect a real time load current level of an associated processor;
receive a first temperature value from a temperature sensor;
calculate a modified current level based on the real time current level, the first temperature value and a pre-defined temperature value; and
apply the modified current level to the processor, wherein in response to the modified current level being lower than the real time load current level, the modified current level allows the associated processor to operate at a higher clock rate while still operating within thermal limits of the VR.

16. The information handling system of claim 15, wherein calculating the modified current level further comprises calculating a current gain multiplier and an offset coefficient, wherein the current gain multiplier and the offset coefficient are determined based on a first difference between the first temperature level and the pre-defined temperature value, the pre-defined temperature value being a dynamic thermal target adjusted by the BMC that the VR can be operated within.

17. The information handling system of claim 15, wherein the modified current level is greater than the real time current level and the modified current level enables the processor to operate at a greater clock rate than a clock rate enabled by the real time current level.

18. The information handling system of claim 15, wherein the firmware further configures the VR controller to:
receive, from the BMC, a plurality of initial target parameters, the initial target parameters comprising an initial real time current level, an initial temperature sensor temperature value, and the pre-defined temperature value;
store the initial target parameters to a VR controller memory; and
calculate a start-up current level based on the initial target parameters.

19. The information handling system of claim 15, further comprising:
a temperature sensor external to the VR and which measures an ambient air temperature of the IHS;
wherein the BMC is in communication with the temperature sensor and is communicatively coupled to the processor and the power subsystem, the BMC having firmware executing thereon that configures the BMC to:
monitor an ambient temperature and a processor temperature;
determine if at least one of the ambient temperature or the processor temperature is greater than a pre-determined threshold temperature; and
in response to determining that at least one of the ambient temperature or the processor temperature is greater than the pre-determined threshold temperature; retrieve a look-up table; identify new target parameters from the look-up table; and transmit the new target parameters from the BMC to the VR, wherein the new target parameters are identified from the look-up table based on the ambient air temperature and the processor temperature.

20. The information handling system of claim 15, wherein the pre-defined temperature value is a threshold temperature value that the VR uses to determine when to start decreasing a magnitude of an amount of load current underreporting, the decreasing of the magnitude of the amount of load current underreporting resulting in the associated processor reducing its load demand on the VR.

* * * * *